United States Patent [19]
Dykstal et al.

[11] Patent Number: 5,179,657
[45] Date of Patent: Jan. 12, 1993

[54] PANEL DEFINITION LANGUAGE FOR COMPUTER DISPLAY

[75] Inventors: David W. Dykstal; Edward A. Fishel; Michael A. Temple; Devon D. Snyder; George D. Timms, Jr., all of Rochester, Minn.; Samuel R. Shi, Cary, N.C.

[73] Assignee: International Business Machines Corporation, Armonk, N.Y.

[21] Appl. No.: 866,964

[22] Filed: Apr. 10, 1992

Related U.S. Application Data

[63] Continuation of Ser. No. 517,710, Jun. 2, 1990, abandoned, which is a continuation of Ser. No. 169,524, Mar. 17, 1988, abandoned.

[51] Int. Cl.⁵ .............................................. G06F 3/14
[52] U.S. Cl. ..................................... 395/161; 395/155; 395/156; 364/DIG. 2; 364/948.21
[58] Field of Search ............ 364/518, 521, 522, 221.9, 364/225.6, 226.4, 513, 948.2, 948.21, 948.22; 340/706, 750; 395/155, 156, 157, 159, 161

[56] References Cited

U.S. PATENT DOCUMENTS

| | | | |
|---|---|---|---|
| 4,785,296 | 11/1988 | Tabata et al. | 340/731 |
| 4,794,382 | 12/1988 | Lai et al. | 340/703 |
| 4,802,162 | 1/1989 | Kakuda et al. | 371/15 |
| 4,803,642 | 2/1988 | Muranaga | 364/513 |

Primary Examiner—Gary V. Harkcom
Assistant Examiner—Phu K. Nguyen
Attorney, Agent, or Firm—Bradley A. Forrest; Lauren C. Bruzzone; John D. Flynn

[57] ABSTRACT

Each panel or display screen of data, is defined by a title and the tagged description of the objects, such as instruction lines, data entry lines, menu areas and command lines. Each of these objects may include other objects, described in the same syntax. Panel definitions are joined in a source file to form a panel group. Objects can be shared by all panels.

3 Claims, 6 Drawing Sheets

FIG.2

```
                        Work With Output Queue
Output Queue:     XXXXXXXXXX         Library: XXXXXXXXXX Type options, press Enter.
   2=Change  3=Hold  4=Cancel  5=Display  6=Release  8=Display attributes Opt  Sp-ID   File         Nbr   User        Pty  Rcd/Pag  Sts  Copy  Formtype
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
 _   XXXXXX  XXXXXXXXXX   XXXX  XXXXXXXXXX   X   XXXXXXX  XXXX  XXX  XXXXXXXXX
                                                                   More...
Parameters or command
===> _____

F3=Exit   F4=Prompt   F5=Refresh   F6=Display queue description
 F12=Previous (C) COPYRIGHT IBM CORP. 1988,1988.
```

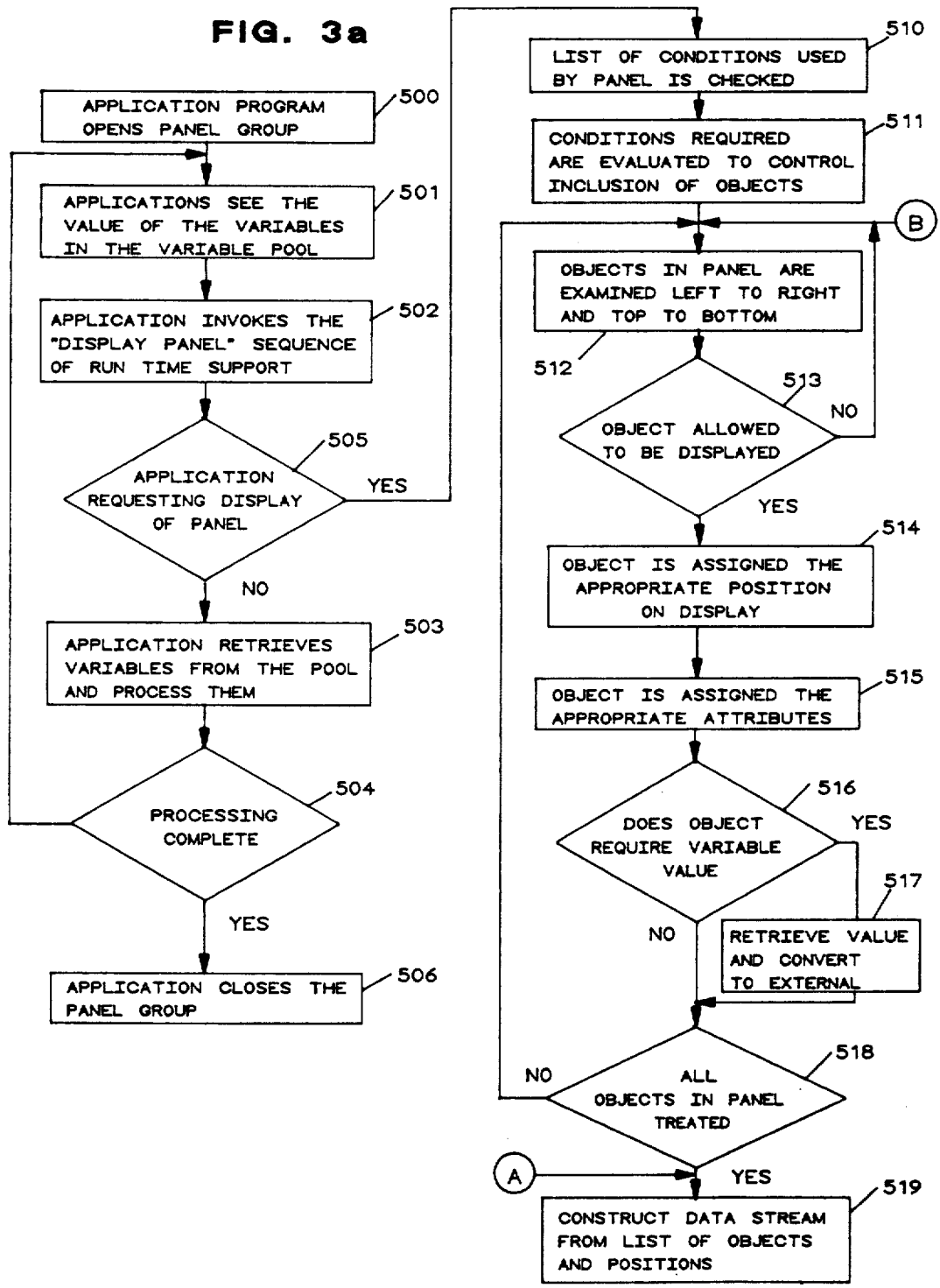

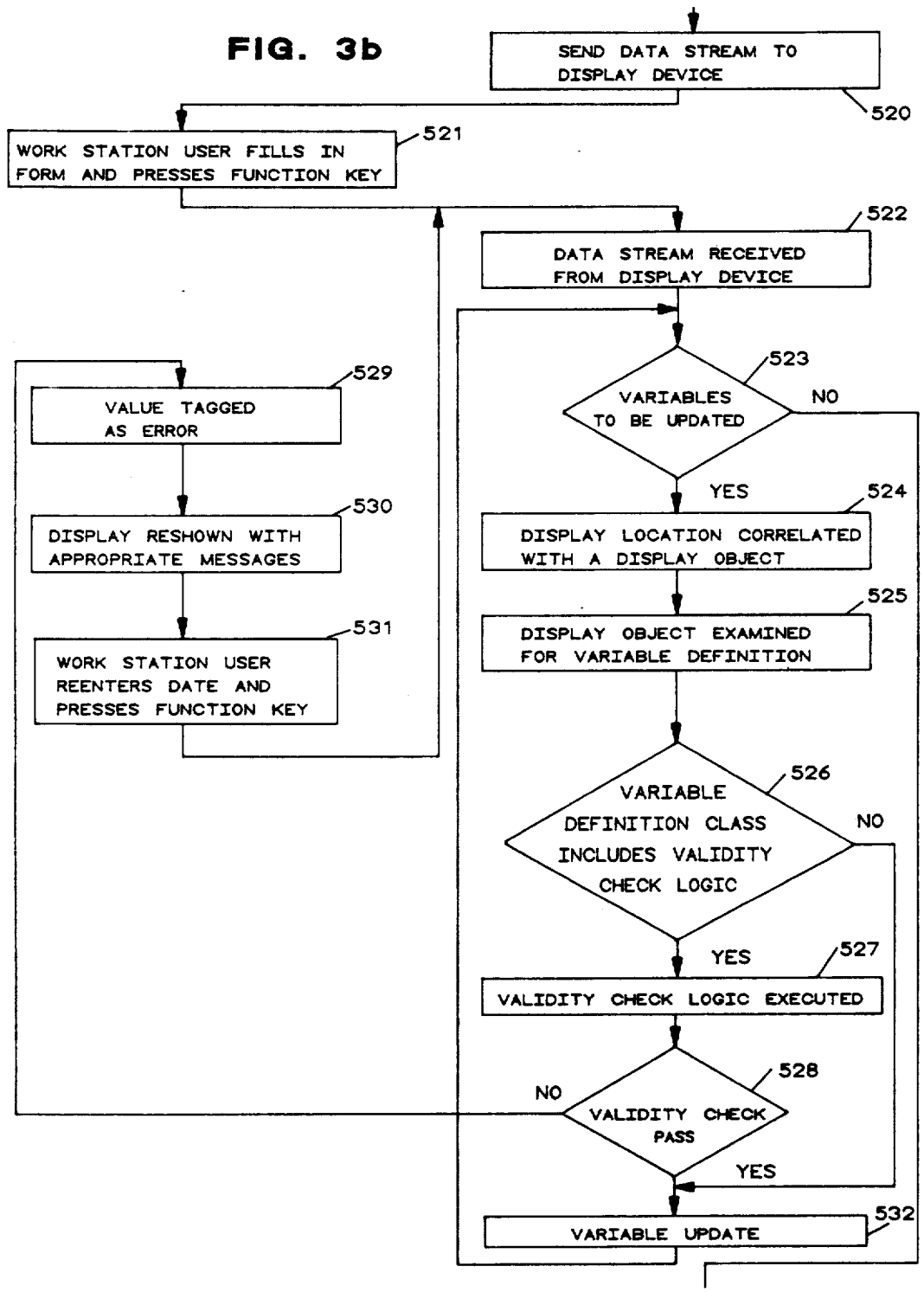

PANEL DEFINITION LANGUAGE FOR COMPUTER DISPLAY

TECHNICAL FIELD

This invention relates to describing, retrieving, modifying, handling and presenting information for plurality of programs to a display device, and specifically to a screen management system which frees the individual application programmers from the routine programming associated with screens and help messages related thereto.

In the development of a new computing system, many programming tasks, particularly those associated with application programs, must proceed in parallel. At the time of announcement of a new computing system, it is essential that sufficient application programs be available to satisfy customer needs. Potential customers would be unwilling to purchase a new system that, in effect, they are unable to use because of the lack of application programs. It is therefore necessary to develop a variety of application programs at the same time the computing system is under development. Traditionally, application programs for a new system are written by the same programming groups who wrote the previous programs of the same type. This means that each of the application programs for a given system are written by different groups. In the past, this has led to each of the application programs having a different "look" in that the screens have different formats, use different colors for particular classes of information, place the command lines and messages in different locations and generally present a different appearance to the operator. Furthermore, the traditional approach of duplicating display functions in each application program has led to inefficiencies and complexities outside of the display itself. For example, data used by more than one program may be stored by each of the using programs. This occupies additional storage space and requires that each location be updated when a change is made.

The lack of screen uniformity among application software programs developed for a new computing system presents problems in testing the programs. Since each application program has its own code for presenting the information to the display device, this code must be tested for each program, even though its purpose and function is largely redundant. Further, the help messages generated in response to an operator request for assistance with respect to specific fields, etc., must be individually written and tested for each application program.

The difficulties with development and testing are but a part of the problem. The problem is well known even to those who use personal computers for nothing more than hobby or home use. Such systems typically use a variety of application programs from different software sources. When a switch is made from one program to another, the screen format also changes. But the problem may also exist with programs supplied by the same vendor because of the difficulties in simultaneously developing the application programs.

The lack of uniformity in screens is more than just an inconvenience. The situation leads to lower operator productivity, higher error rates, discontented computer operators, and ultimately, to a dissatisfied computer customer.

BACKGROUND ART

The prior art has been more concerned with the problems relating to accommodation of different display devices on the same system than the lack of uniformity of screens between application programs. The prior art has also addressed the problems which arise when new displays are added to an old system.

Exemplary of the prior art is U.S. Pat. No. 4,586,158 which describes a mapping service which effects the interface between the application program and the physical presentation of the information on the display screen. Simply stated, the program logic of the mapping service transforms the data represented in the format of the application program into another format based on a specified set of rules. There is no suggestion as to how displayed data common to more than one application program could be shared. This system operates to change the stored data in accordance with a set of predetermined rules, and there is no suggestion as to how the data can be specified so as to be uniformly usable by all the display devices and screens without the need for reformatting.

DISCLOSURE OF THE INVENTION

A primary object of this invention is to provide a common interface between data shared by a plurality of application programs and a system display.

Another object of the invention is to provide a display-application program interface in which the elements which make up a display, i.e., objects, are specified in generic fashion to allow their use by a plurality of displays and application programs.

It is another object of this invention to provide a display-application program interface which accommodates the use of operator help messages common to more than one application program and display.

Still another object of this invention is to provide a display-application program interface in which the specification of the objects in a given panel provides the basis for the selection of appropriate operator help messages.

These and other objects, features and advantages are realized by an application program-display interface which utilizes tags to reference all objects, which, for example, may be a panel, i.e., a panel title, a single screen of data, instruction lines, data entry areas, menu areas or command lines. Each tag includes a tag name and one or more attributes.

BRIEF DESCRIPTION OF THE DRAWINGS

FIG. 2 is an example of a sample list screen developed with this invention.

FIGS. 3a-3d are block diagram representations of the programming aspects of this invention.

DESCRIPTION OF THE INVENTION

Figure 1:
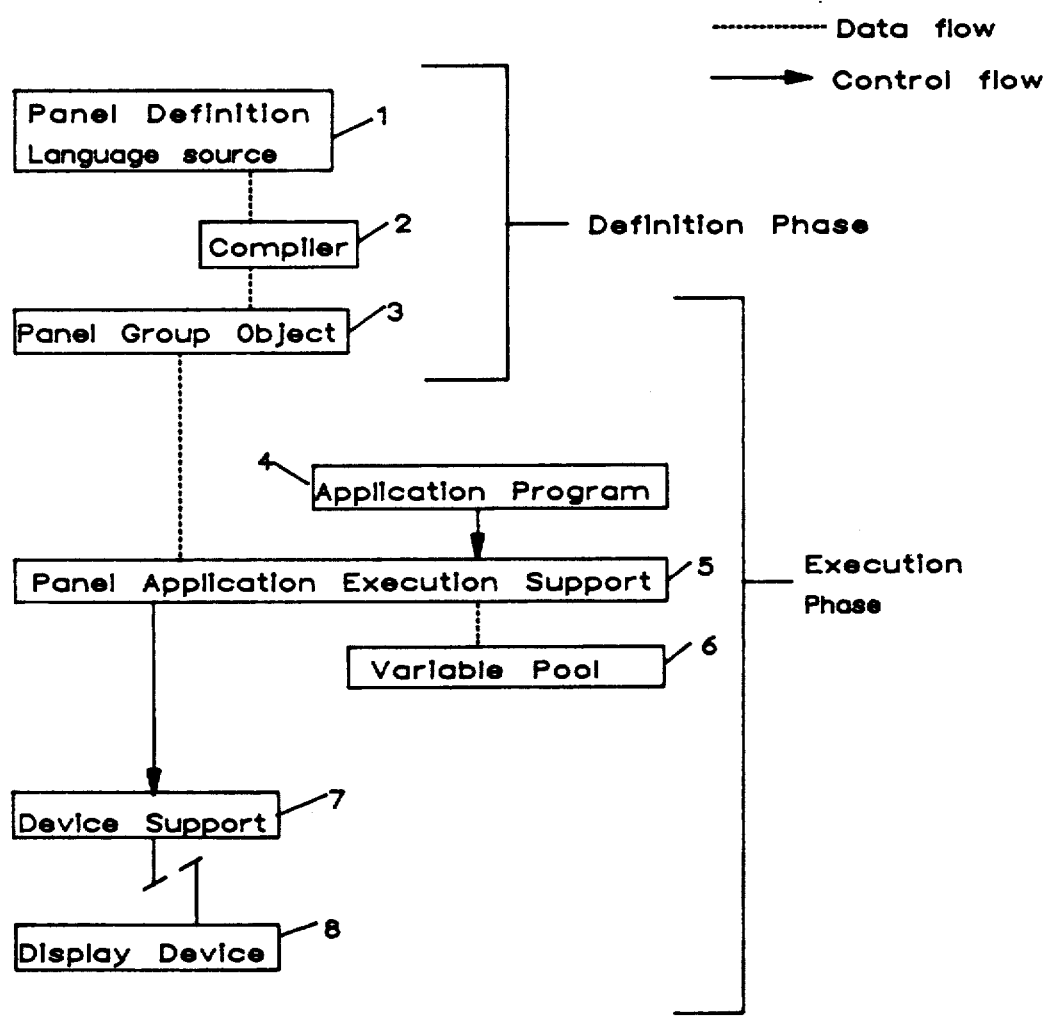
FIG. 1 is a block diagram representation of the operation of the invention.
Figure 3C:
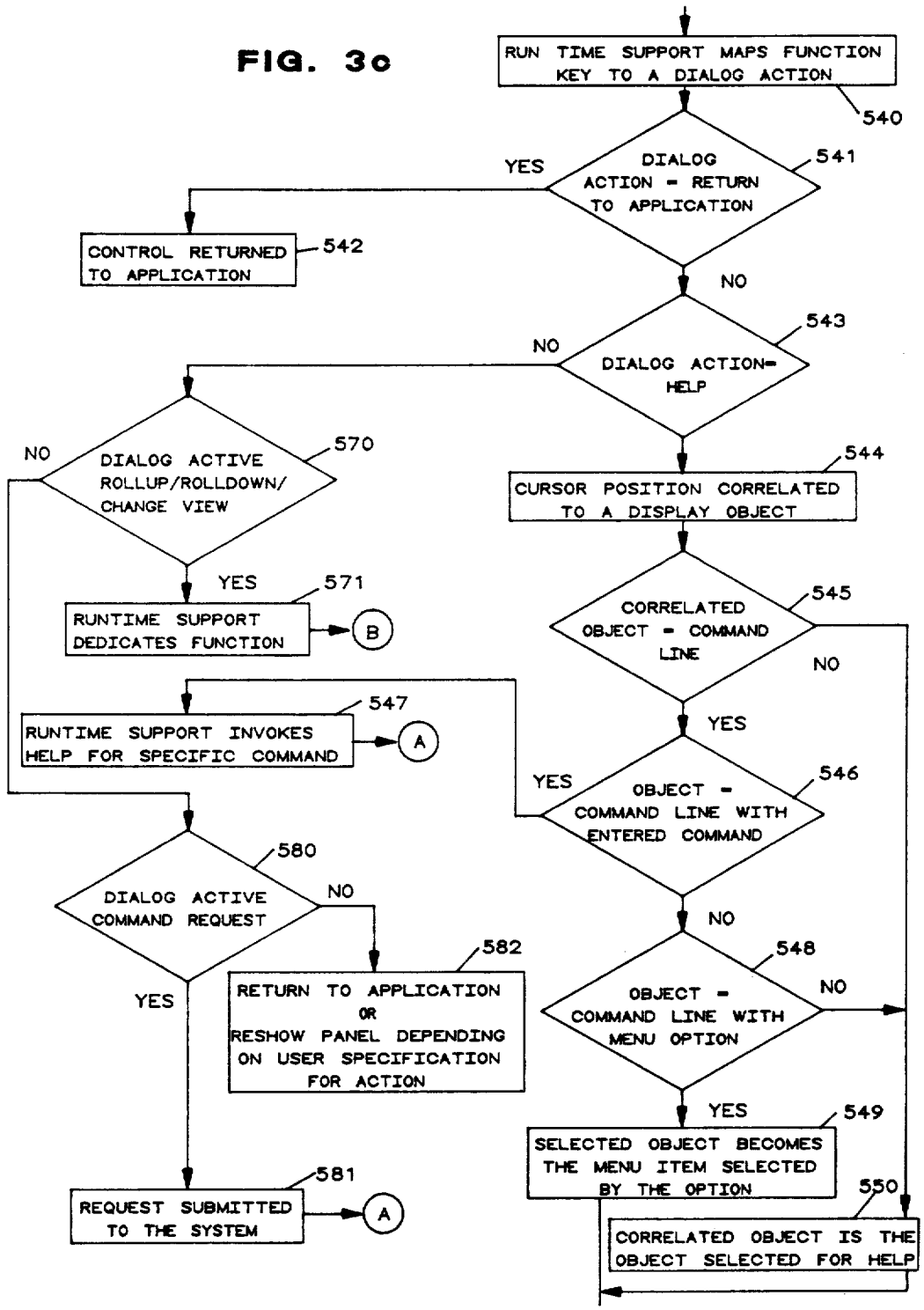
Figure 3D:
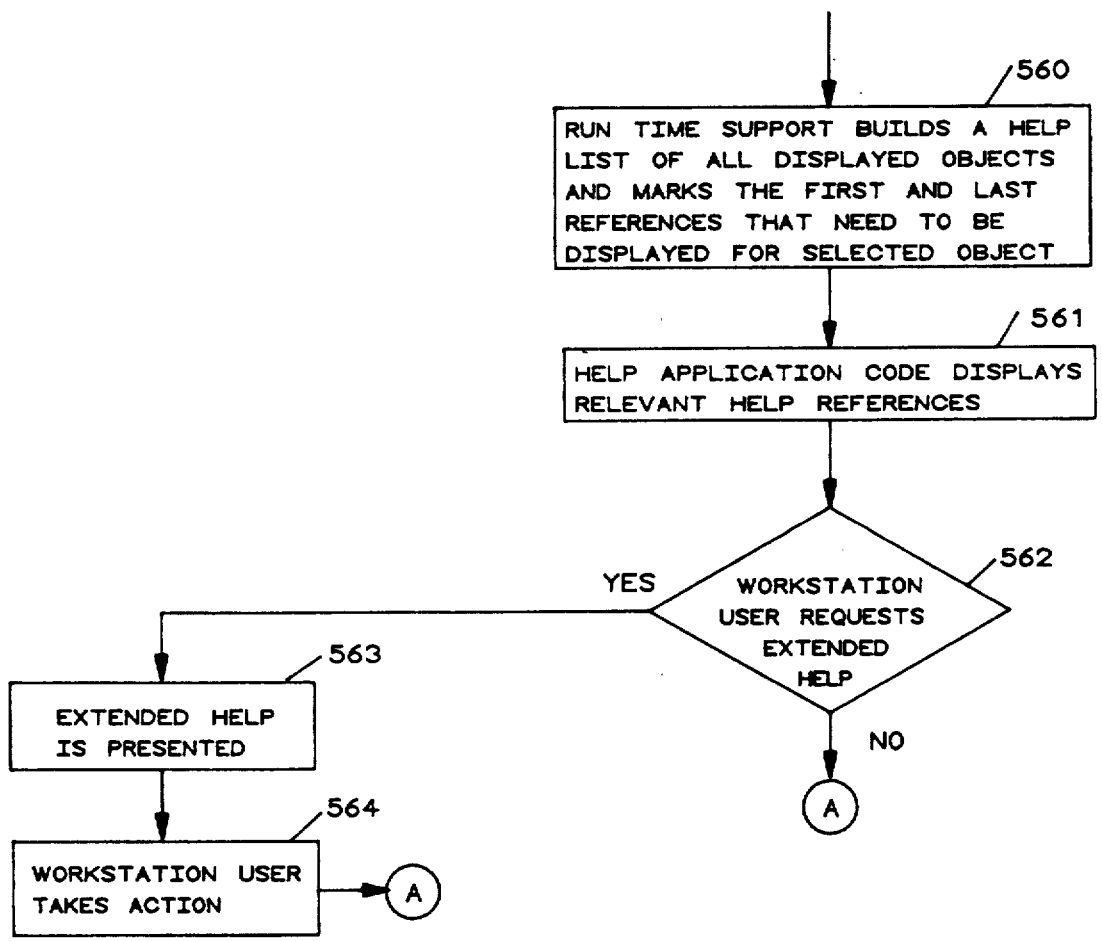

A screen oriented, high level language is used to define and manage a display screen as shown in FIG. 1. In a data processing system which utilizes a number of application programs, the system programmer will define the screens for a given application program using the high level language as depicted in block This program is then compiled by the compiler 2 which creates the panel group objects 3. The application program 4 interacts with the panel group objects by means of the panel application execution support 5, which accesses the variable pool 6 and interfaces with the device support 7. The display device 8 is operated under the control of device support 7.

"Objects", which are the items placed on the display screen, are designated by means of tags. Each tag may have attributes which further define the nature of the object. Objects which need to be referenced either in the source or at run time by an application program, possess a name attribute. Many objects will also have associated text which immediately follows the tag.

The syntax of a tag follows the format:

```
:tagname attr1=attr1val
         attr2=attr2val
         attr3=attr3val
         . . . . . . .
         attrn-attrnval.
```

Text associated with the object.

The fundamental object in the language is the "panel" described by the "panel" tag. Each panel consists of its text, which is a title, followed by the tagged descriptions of the objects, which make up the particular panel. Such objects include instruction lines, data entry areas, menu areas and command lines. These object may, in turn, be made up of other objects, all described with the same syntax.

Panel definitions are grouped together in the source file to form a "panel group". All panels in a group are capable of sharing definitions of other named objects defined in the panel group. All objects which can be shared among several panels, such as function key lists, are used by specifying their names on the appropriate attributes of the panel tag as shown in the following illustration.

```
:key1 name=standard . . .
:keyi . . . . .           } Definition of a shared key list object
:keyi . . . . .
:ekey1.
```

```
                 /— Use of the shared key list object
         /‾‾‾‾‾\
:panel name=x key=standard . . .
. . . .
:epanel.
```

In addition to panels, other objects are declared in the panel group. These facilitate the definition of panels by providing an encapsulation of some sort of shared characteristic.

"Classes" are used to define a set of common attributes for the data to be displayed on a panel or used for control purposes. They provide a very simple means of data abstraction that can be applied to this data. Characteristics include:

The base type of the values, i.e., packed, binary, etc.

Shift characteristics for input fields for variables of this class.

Number of character positions a value of this class should occupy on a display.

Translation to/from internal value from/to display value.

Checking of values entered on the display to meet certain criteria, i.e., range or specific value checks.

"Variables" define the actual data used by an application in this panel group. Variables are given a name and reference a class. All variables declared in this panel group are collected into a data structure called a "variable pool", manipulated by the application program.

"Conditions" are objects which influence the inclusion of other objects when that panel is displayed. A condition is specified in a "minilanguage" attribute of the condition tag. That condition is then evaluated during application program execution to control the inclusion of panel elements.

"List Objects" provide an object which consists of rows of like columns of data. An application execution interface allows the contents of a particular row to be exchanged with a set of variables from the variable pool. A "List Area" is an object found in the panel which provides the viewing characteristics of this underlying data object. "Truth Tables" are objects which control the mutual exclusion of conditional items in a panel object. Application program developers use truth tables to provide information to the compile time formatter concerning which of the panel elements are never coexistent on the same panel.

"Key Lists" can be shared among panel objects to define actions which take place on that panel when keys, in particular, function keys, are pressed.

"Panels" at the object that maps to the actual display surface. Panels use, either directly or indirectly, all of the above objects.

The following is an outline for the source describing a set of interactive panels:

| Panel Group (:PNLGRP) | |
|---|---|
| prolog section | |
| class definitions | (:CLASS) |
| variable definitions | (:VAR) |
| list definitions | (:LISTDEF) |
| condition definitions | (:COND) |
| truth table definitions | (:TT) |
| key mapping list definitions | (:KEYL) |
| body section | |
| panel definitions | (:PANEL) |
| area definitions | (:MENU,:INFO,:DATA,:LIST) |
| command/option line definition | (:CMDLINE,:OPTLINE) |
| help module definitions | (:HELP) |
| ISIL tagged test | |

FIG. 2 shows a sample list panel. The first step in implementing this panel is to define the screen using the tag language. The following tag source produces the desired screen.

The first step in implementing the panel of FIG. 2 is to define the screen using the following tag source producing the desired screen.

```
.* This panel group has special second-level help ("help on help")
.* contained in help module E1HLPHLP, and allows access to
.* information search index QHSS1. A copyright statement will be
.* displayed on the first panel displayed after the UIM application
.* is opened. Any help module name not found in this panel group
.* will be resolved using panel group object EX1HLPGRP.
```

```
:PNLGRP  SCHIDX=QHSS1.
:IBMCOPYR PROD=5278SS1.
:IMPORT PNLGRP=ex1hlpgrp NAME='*'.
.*
.* Define classes for all variables used in the application.  A class
.* is essentially a user-defined data type.  Note that class STSCL
.* uses a translation list to map between internal 1-character status
.* values and 4-character display values.  Also note that the WIDTH
.* attribute specifies the external length of the field, which may be
.* less than the maximum required to edit the value (such as for
.* numeric class RECSCL), but must be large enough for all translated
.* external values.
.*
:CLASS  NAME=optcl    BASETYPE='action' WIDTH=1.
:ECLASS.
:CLASS  NAME=spidcl   BASETYPE='char 6'.
:ECLASS.
:CLASS  NAME=filecl   BASETYPE='char 10'.
:ECLASS.
:CLASS  NAME=nbrcl    BASETYPE='bin 15' WIDTH=4.
:ECLASS.
:CLASS  NAME=usercl   BASETYPE='char 10'.
:ECLASS.
:CLASS  NAME=ptycl    BASETYPE='char 1'.
:ECLASS.
:CLASS  NAME=recscl   BASETYPE='bin 31' WIDTH=7.
:ECLASS.
:CLASS  NAME=stscl    BASETYPE='char 1' WIDTH=4.
:TL.
:TI  VALUE='*1*'.HLD
:TI  VALUE='*2*'.RDY
:TI  VALUE='*3*'.OPN
:TI  VALUE='*4*'.CLO
:TI  VALUE='*5*'.WTR
:TI  VALUE='*6*'.*HLD
:TI  VALUE='*7*'.*CHG
:TI  VALUE='*8*'.*RLS
:TI  VALUE='*9*'.*CNL
:ETL.
:ECLASS.
:CLASS  NAME=copycl   BASETYPE='bin 15' WIDTH=3.
:ECLASS.
:CLASS  NAME=formcl   BASETYPE='char 16'.
:ECLASS.
:CLASS  NAME=jobcl    BASETYPE='char 10'.
:ECLASS.
:CLASS  NAME=jnbrcl   BASETYPE='char 6'.
:ECLASS.
:CLASS  NAME=oqcl     BASETYPE='char 10'.
:ECLASS.
:CLASS  NAME=libcl    BASETYPE='char 10'.
:ECLASS.
:CLASS  NAME=parmcl   BASETYPE='char 255'.
:ECLASS.
:CLASS  NAME=qspmodcl BASETYPE='PTR'.
```

:ECLASS.
.*
.* Define all dialog variables (other than Z-variables) that will
.* be used by the open application. Note you can define variables
.* (like JOB and JNBR) that do not appear anywhere on the panel, to
.* simplify application program logic and to provide values for UIM
.* functions other than displaying panels.
.*
:VAR    NAME=opt    CLASS=optcl.
:VAR    NAME=spid   CLASS=spidcl.
:VAR    NAME=file   CLASS=filecl.
:VAR    NAME=nbr    CLASS=nbrcl.
:VAR    NAME=user   CLASS=usercl.
:VAR    NAME=pty    CLASS=ptycl.
:VAR    NAME=recs   CLASS=recscl.
:VAR    NAME=sts    CLASS=stscl.
:VAR    NAME=copy   CLASS=copycl.
:VAR    NAME=form   CLASS=formcl.
:VAR    NAME=job    CLASS=jobcl.
:VAR    NAME=jnbr   CLASS=jnbrcl.
:VAR    NAME=oq     CLASS=oqcl.
:VAR    NAME=lib    CLASS=libcl.
:VAR    NAME=parms  CLASS=parmcl.
:VAR    NAME=qspmod CLASS=qspmodcl.
.*
.* Define a list (named OUTQLIST) to contain all fields that appear
.* in the tabular part of the display, plus some fields (JOB and
.* JNBR) that are only used internally to support action list
.* processing. The order that variable names appear on the VARS
.* attribute controls the internal structure of the list, but does
.* not limit how list entries are displayed or otherwise processed.
.*
:LISTDEF NAME=outqlist
         VARS='opt spid file nbr user pty recs sts copy form job jnbr'.
.*
.* Define all function key assignments. You must specify all keys
.* (including engraved keys such as ENTER) that will be active on the
.* panel. The keys must be defined in the order that they will be
.* presented at the bottom of a panel and in on-line help. Only those
.* keys with translatable text specified are described at the bottom
.* of a panel, but all keys are described in on-line help. Any panel
.* within this panel group can reference these key assignments by
.* specifying OUTQKEYS as a key mapping list.
.*
:KEYL   NAME=outqkeys.
:KEYI   KEY=f3        HELP=exit     ACTION=exit.
F3=Exit
:KEYI   KEY=f4        HELP=prompt   ACTION=prompt.
F4=Prompt
:KEYI   KEY=f5        HELP=refresh  ACTION='return 65'.
F5=Refresh
:KEYI   KEY=f6        HELP=wrkoutqd ACTION='CMD WRKOUTQD OUTQ(&LIB/&OQ)'.
F6=Display queue description
:KEYI   KEY=f12       HELP=previous ACTION=previous.

F12=Previous
:KEYI   KEY=enter     HELP=enter    ACTION=enter.

```
:KEYI  KEY=rollup    HELP=rollup   ACTION=rollup.
:KEYI  KEY=rolldown  HELP=rolldown ACTION=rolldown.
:KEYI  KEY=help      HELP=help     ACTION=help.
:KEYI  KEY=print     HELP=print    ACTION=print.
:EKEYL.
.*
.* This panel definition contains two areas: an information area and
.* a list area. The areas must be declared in the order (top to
.* bottom) that they will appear on the display.
.*
.* The PANEL tag specifies basic panel attributes, and the panel
.* title. Note that the bottom separator for the panel defaults to
.* SPACE, and the default message area is a single line.
.*
:PANEL NAME=wrkoutq HELP='wrkoutq/workwithoutputq'
       KEYL=outqkeys TOPSEP=SPACE.
Work With Output Queue
.*
.* The data presentation area is topmost on the panel, so the top
.* separator for this area (which defaults to SPACE, or a blank line)
.* is the top separator for the entire panel. This area is not
.* scrollable, consists of only two lines, and contains only two
.* horizontal output data items (used to display the output queue
.* and library names).
.*
:DATA  DEPTH=2 LAYOUT=horiz HELP='wrkoutq/outputq'
:DATAI VAR=oq   USAGE=out.
Output queue
:DATAI VAR=lib  USAGE=out.
Library
:EDATA.
.*
.* The list area uses the bulk of the display. By default, it is
.* scrollable, arranged in single-column layout, allows the column
.* headings to expand to use up to three lines (for translation
.* space), and is separated from the area above by a single blank
.* line. There is a top instruction line at the top of the area.
.*
.* This list area shows a view of the list named OUTQLIST. DEPTH='*'
.* allows the area to use as many lines of the display as remain
.* after other panel areas are allocated. This is done to show as
.* many list entries as possible on the display. There are no
.* alternate-view columns in the area definition, so all list columns
.* are shown whenever the panel is displayed.
.*
:LIST DEPTH='*' MAXHEAD=2 LISTDEF=outqlist ACTOR=uim
       PARMS=parms BOTSEP=SPACE.
:TOPINST.Type options, press Enter.
.*
.* Define the valid list actions for the workstation operator. Only
.* values specified on LISTACT tags will be allowed in the action
.* field for the list area (in this case, OPT). Actions must be
.* defined in the order that they will be presented at the top of the
.* list area and in on-line help. Only those actions with
.* translatable text specified are described at the top of the list,
.* but all options are described in on-line help.
```

```
.*
.* Specifying ACTOR=UIM on the LIST tag, combined with an
.* ENTER attribute on all LISTACT tags indicates the UIM will
.* process all option values entered in the list. When only the
.* ENTER attribute is specified, the operator cannot prompt for
.* that option value. When PROMPT is specified, it is used for
.* prompting. An exit program is also used for actions that could
.* require the list entry to be updated (like options 2 and 4).
.*
.* Normally the ENTER value for an option is used whenever ENTER is
.* pressed, but some options (like option 2) force use of the prompt
.* action (PROMPT) when the command line is blank. Note that the
.* values specified on duplicate attributes are concatenated to make
.* up the action string when it is too long for one source line (like
.* ENTER and PROMPT on option 2).
.*
.* In the example below, the EXIT attribute is specified for every
.* list action that could require a change to a list entry. The
.* program specified on the EXIT attribute will be invoked by the UIM
.* after the action is performed, to allow it to update or delete the
.* corresponding list entry (to match the state of the underlying
.* spooled output file).
.*
:LISTACT  OPTION=2  HELP=wrkoutq/change  NOCMD=prompt
          ENTER='CMD ?CHGSPLFA FILE(&FILE) JOB(&JNBR/&USER/&JOB)'
          ENTER=  ' SPLNBR(&NBR) &PARMS'
          PROMPT='CMD ?CHGSPLFA ?*FILE(&FILE) ?*JOB(&JNBR/&USER/&JOB)'
          PROMPT=  ' ?*SPLNBR(&NBR) ?<COPIES(©)'
          PROMPT=  ' ?<FORMTYPE(''&FORM'') &PARMS'
          USREXIT='CALL QSPMOD'.
2=Change
:LISTACT  OPTION=3  HELP=wrkoutq/hold
          ENTER='CMD HLDSPLF FILE(&FILE) JOB(&JNBR/&USER/&JOB)'
          ENTER=  ' SPLNBR(&NBR)'
          USREXIT='CALL QSPMOD'.
3=Hold
:LISTACT  OPTION=4  HELP=wrkoutq/cancel
          ENTER='CMD CNLSPLF FILE(&FILE) JOB(&JNBR/&USER/&JOB)'
          ENTER=  ' SPLNBR(&NBR)'
          USREXIT='CALL QSPMOD'.
4=Cancel
:LISTACT  OPTION=5  HELP=wrkoutq/display
          ENTER='CMD DSPSPLF FILE(&FILE) JOB(&JNBR/&USER/&JOB)'
          ENTER=  ' SPLNBR(&NBR)'.
5=Display
:LISTACT  OPTION=6  HELP=wrkoutq/release
          ENTER='CMD RLSSPLF FILE(&FILE) JOB(&JNBR/&USER/&JOB)'
          ENTER=  ' SPLNBR(&NBR)'
          USREXIT='CALL QSPMOD'.
6=Release
:LISTACT  OPTION=8  HELP='wrkoutq/displayattributes'
          ENTER='CMD DSPSPLFA FILE(&FILE) JOB(&JNBR/&USER/&JOB)'
          ENTER=  ' SPLNBR(&NBR)'
          USREXIT='CALL QSPMOD'.
8=Display Attributes
.*
```

```
.*  Define the columns of the list. The variable displayed in each
.*  column must be contained in the list for the area (in this case,
.*  OUTQLIST). Only the list values specified on LISTCOL tags are
.*  displayed on the panel. A LISTCOL tag is not needed for all
.*  variables in the list. The columns must be defined on the
.*  LISTVIEW tag in the order that they will appear on the panel
.*  (left-to-right), which may be different than the order the
.*  variables appear on the LISTDEF tag.
.*
:LISTCOL  VAR=opt    USAGE=inout   HELP='wrkoutq/opt'   MAXWIDTH=3.
Opt
:LISTCOL  VAR=spid   USAGE=out     HELP='wrkoutq/spid'  MAXWIDTH=6.
Sp-ID
:LISTCOL  VAR=file   USAGE=out     HELP='wrkoutq/file'  MAXWIDTH=10.
File
:LISTCOL  VAR=nbr    USAGE=out     HELP='wrkoutq/nbr'   MAXWIDTH=4.
Nbr
:LISTCOL  VAR=user   USAGE=out     HELP='wrkoutq/user'  MAXWIDTH=10.
User
:LISTCOL  VAR=pty    USAGE=out     HELP='wrkoutq/pty'   MAXWIDTH=3.
Pty
:LISTCOL  VAR=recs   USAGE=out     HELP='wrkoutq/recs'  MAXWIDTH=7.
Rcd/Pag
:LISTCOL  VAR=sts    USAGE=out     HELP='wrkoutq/sts'   MAXWIDTH=4.
Sts
:LISTCOL  VAR=copy   USAGE=out     HELP='wrkoutq/copy'  MAXWIDTH=4.
Copy
:LISTCOL  VAR=form   USAGE=out     HELP='wrkoutq/form'  MAXWIDTH=9.
Formtype
:LISTVIEW COLS='opt spid file nbr user pty recs sts copy form'.
.*
.*  The list area ends with a command line, which can be used
.*  either to enter commands or to specify additional parameters
.*  for some action list options.
.*
:ELIST.
:CMDLINE SIZE=LONG.
Parameters or command
.* NOTE: BOTINST removed
:EPANEL.
:EPNLGRP.
```

The following describes skeleton help text necessary to support the panel of FIG. 2. It would be stored in a panel group names E1HLPGRP. The help could also be stored in the same panel group object, manufactured supplied help should normally be stored in separate panel group objects so it can be loaded onto the system or not at the user's option.

```
.*
.*  This panel group contains only help text "modules". Help modules
.*  generally describe specific display "objects" (defined using tags)
.*  in a panel definition. The help text module for an object is
.*  displayed whenever help is requested by the workstation operation
.*  for that specific object.
.*
.*  When the operator's request is not clearly for any specific object
.*  on the panel, all help modules referenced in the panel definition
```

```
.*  are combined and presented on a single help panel.  The combined
.*  help can also be accessed using a function key on the panel that
.*  displays help for a specific display object.
.*
.*  The order that text from help modules appears in the combined help
.*  depends on the hierarchy of objects in the panel definition.
.*  Although help text module definitions (like those below) may
.*  appear in any order in the tag source, they are shown here in the
.*  order they would be combined for panel. WRKOUTQ.
.*
:PNLGRP.
.*
.*
:HELP  NAME='wrkoutq/workwithoutputq'.
:p.This is the main help text for the panel.  It is displayed when
the HELP key is pressed and the cursor is positioned in an area that
has no other help text.
:EHELP.
.*
.*
:HELP  NAME='wrkoutq/outputq'.
:p.This is the help text for the info area.  It is displayed when
the HELP key is pressed and the cursor is positioned on the line that
contains the info area (the line with the output queue and library
information).
:EHELP.
.*
.*
:HELP  NAME='wrkoutq/change'.
:p.This is the help text for Option 2.  It is displayed when the
HELP key is pressed and the cursor is positioned in an area that has
no other help text.
:EHELP.
.*
.*
:HELP  NAME='wrkoutq/hold'.
:p.This is the help text for Option 3.  It is displayed when the
HELP key is pressed and the cursor is positioned in an area that has
no other help text.
:EHELP.
.*
.*
:HELP  NAME='wrkoutq/cancel'.
:p.This is the help text for Option 4.  It is displayed when the
HELP key is pressed and the cursor is positioned in an area that has
no other help text.
:EHELP.
.*
.*
:HELP  NAME='wrkoutq/display'.
:p.This is the help text for Option 5.  It is displayed when the
HELP key is pressed and the cursor is positioned in an area that has
no other help text.
:EHELP.
.*
```

```
:HELP  NAME='wrkoutq/release'.
:p.This is the help text for Option 6.  It is displayed when the
HELP key is pressed and the cursor is positioned in an area that has
no other help text.
:EHELP.
.*
.*
:HELP  NAME='wrkoutq/displayattributes'.
:p.This is the help text for Option 8.  It is displayed when the
HELP key is pressed and the cursor is positioned in an area that has
no other help text.
:EHELP.
.*
.*
:HELP  NAME='wrkoutq/opt'.
:p.This is the help text for the Opt field.  It is displayed when
the HELP key is pressed and the cursor is positioned on the Opt column
in the list.
:EHELP.
.*
.*
:HELP  NAME='wrkoutq/spid'.
:p.This is the help text for the Sp-ID field.  It is displayed
when the HELP key is pressed and the cursor is positioned on the Sp-ID
column in the list.
:EHELP.
.*
.*
:HELP  NAME='wrkoutq/file'.
:p.This is the help text for the File field.  It is displayed when
the HELP key is pressed and the cursor is positioned on the File column
in the list.
:EHELP.
.*
.*
:HELP  NAME='wrkoutq/nbr'.
:p.This is the help text for the Nbr field.  It is displayed when
the HELP key is pressed and the cursor is positioned on the Nbr column
in the list
:EHELP.
.*
.*
:HELP  NAME='wrkoutq/user'.
:p.This is the help text for the User field.  It is displayed when
the HELP key is pressed and the cursor is positioned on the User column
in the list.
:EHELP.
.*
.*
:HELP  NAME='wrkoutq/pty'.
:p.This is the help text for the Pty field.  It is displayed when
the HELP key is pressed and the cursor is positioned on the Pty column
in the list.
:EHELP.
.*
```

```
.*
:HELP NAME='wrkoutq/recs'.
:p.This is the help text for the Rcd/Pag field. It is displayed
when the HELP key is pressed and the cursor is positioned on the
Rcd/Pag column in the list.
:EHELP.
.*
.*
:HELP NAME='wrkoutq/sts'.
:p.This is the help text for the Sts field. It is displayed when
the HELP key is pressed and the cursor is positioned on the Sts column
in the list.
:EHELP.
.*
.*
:HELP NAME='wrkoutq/copy'.
:p.This is the help text for the Copy field. It is displayed when
the HELP key is pressed and the cursor is positioned on the Copy column
in the list.
:EHELP.
.*
.*
:HELP NAME='wrkoutq/form'.
:p.This is the help text for the Formtype field. It is displayed
when the HELP key is pressed and the cursor is positioned on the
Formtype column in the list.
:EHELP.
.*
.*
:HELP NAME=enter.
:p.This is the help text for the ENTER key. It is displayed when
the HELP key is pressed and the cursor is positioned in the function
key definition area.
:EHELP.
.*
.*
:HELP NAME=rollup.
:p.This is the help text for the ROLLUP key. It is displayed when
the HELP key is pressed and the cursor is positioned in the function
key definition area.
:EHELP.
.*
.*
:HELP NAME=rolldown.
:p.This is the help text for the ROLLDOWN key. It is displayed
when the HELP key is pressed and the cursor is positioned in the
function key definition area.
:EHELP.
.*
.*
:HELP NAME=help.
:p.This is the help text for the HELP key. It is displayed when
the HELP key is pressed and the cursor is positioned in the function
key definition area.
:EHELP.
.*
```

```
:HELP  NAME=print.
:p.This is the help text for the PRINT key.  It is displayed when
the HELP key is pressed and the cursor is positioned in the function
key definition area.
:EHELP.
.*
.*
:HELP  NAME=exit.
:p.This is the help text for the F3 function key.  It is displayed
when the HELP key is pressed and the cursor is positioned in the
function key definition area.
:EHELP.
.*
.*
:HELP  NAME=prompt.
:p.This is the help text for the F4 function key.  It is displayed
when the HELP key is pressed and the cursor is positioned in the
function key definition area.
:EHELP.
.*
.*
:HELP  NAME=refresh.
:p.This is the help text for the F5 function key.  It is displayed
when the HELP key is pressed and the cursor is positioned in the
function key definition area.
:EHELP.
.*
.*
:HELP  NAME=wrkoutqd.
:p.This is the help text for the F6 function key.  It is displayed
when the HELP key is pressed and the cursor is positioned in the
function key definition area.
:EHELP.
.*
.*
:HELP  NAME=previous.
:p.This is the help text for the F12 function key.  It is displayed
when the HELP key is pressed and the cursor is positioned in the
function key definition area.
:EHELP.
:EPHLGRP.
```

The following describes the code necessary to support the previously defined panel. The first thing to be done is to build a structure used to communicate with the variable pool. Space must be allocated by the program for each dialog variable value that will be referenced in the program. This space will be used to specify where to put retrieved values of dialog variables on GETVAR operations and where to get values to update dialog variables on PUTVAR operations.

```
/***********************************************************/
/* Declare program variable storage for all dialog variables.   */
/* The attributes of each program variable should match (or be  */
/* compatible with) the corresponding dialog variable, because  */
/* the UIM does not support data conversions in its API.        */
/***********************************************************/

DCL 1 I1,                        /* Information-only variables:  */
    3 QSPMOD  PTR(SYP),          /* User exit program pointer    */
    3 OQ      CHAR(10),          /* Output queue name            */
    3 LIB     CHAR(10);          /* Output queue library name    */

DCL 1 L1,                        /* Variables defined in list:   */
                                 /* Option field not used by this */
                                 /* program (so not declared)    */
    3 SPID    CHAR(6),           /* Spool file identifier        */
    3 FILE    CHAR(10),          /* Spool file name              */
    3 NBR     BIN(15),           /* Spool file number            */
    3 USER    CHAR(10),          /* User profile name            */
    3 PTY     CHAR(1),           /* Spool file priority          */
    3 RECS    BIN(31),           /* Number of records/pages      */
    3 STS     CHAR(1),           /* Spool file status            */
    3 COPY    BIN(15),           /* Number of copies             */
    3 FORM    CHAR(16),          /* Form type                    */
    3 JOB     CHAR(10),          /* Job name                     */
    3 JNBR    CHAR(6);           /* Job number                   */
```

The next step is to invoke the VARLST and VARLSTE macros to build and initialize the variable list data structure(s) required by the GETVAR and PUTVAR functions. To simplify coding later on, two different structures are built. The first structure will be used to communicate with just the INFO variables. The second structure will be used to communicate with the LIST variables.

The following describes the code necessary to build and initialize the INFO variable list data structure.

```
/******************************************************************/
/* Define a variable list data structure, initialized to support   */
/* processing the information variables in structure I1. The       */
/* attributes of each variable are specified, so the UIM will      */
/* check (at execution time) that the variable values passed by    */
/* the program match the panel group object definition.            */
/******************************************************************/

? VARLST  PFIX(INFO)              /* Variable list structure INFO  */
             ENTRIES(2)
             VARSTG(I1);

? VARLSTE DLGVAR(QSPMOD)          /* Initialize entry for QSPMOD   */
             OFFSET(OFFSET(QSPMOD))
             ATTR(PTR);

? VARLSTE DLGVAR(OQ)              /* Initialize entry for OQ       */
             OFFSET(OFFSET(OQ))
             ATTR(CHAR,LENGTH(OQ));

? VARLSTE DLGVAR(LIB)             /* Initialize entry for LIB      */
             OFFSET(OFFSET(LIB))
             ATTR(CHAR,LENGTH(LIB));
```

The following describes the code necessary to build and initialize the LIST variable list data structure.

```
/******************************************************************/
/* Define a variable list data structure, initialized to support   */
/* processing the information variables in structure L1. The       */
/* attributes of each variable are specified, so the UIM will      */
/* check (at execution time) that the variable values passed by    */
/* the program match the panel group object definition.            */
/******************************************************************/

? VARLST  PFIX(LIST)              /* Variable list structure LIST  */
             ENTRIES(11)
             VARSTG(L1);

? VARLSTE DLGVAR(SPID)            /* Initialize entry for SPID     */
             OFFSET(OFFSET(SPID))
             ATTR(CHAR,LENGTH(SPID));

? VARLSTE DLGVAR(FILE)            /* Initialize entry for FILE     */
             OFFSET(OFFSET(FILE))
             ATTR(CHAR,LENGTH(FILE));

? VARLSTE DLGVAR(NBR)             /* Initialize entry for NBR      */
             OFFSET(OFFSET(NBR))
             ATTR(BIN,15);

.   .   .   .   .  .   .   .   .   .
         .                                   .
         .   (continued for all LIST variables)   .
         .                                   .
         .   .   .   .   .      .   .   .   .
```

The following line will pull in the declaration of constants.

```
? WWUIXCON;                /* Get the UIM constants      */
```

After all declarations are completed, the UIM is invoked to start a new application. To do this, the program must code an invocation of macro OPENAPP.

The OPENAPP macro requires two parameters: PNLGRP and APPID. The panel group we wish to open is EXAMPLE1. The OPENAPP macro returns an application identifier into the variable specified for the APPID keyword. The APPID value must be used throughout the program to tell the UIM which open application to use for all requests.

```
? OPENAPP  PNLGRP(EXAMPLE1)      /* Open a UIM application    */
           APPID(&APPID);
```

Now that the application is open, dialog variables and insert list entries that will appear on panels in the open application can be set.

On the example panel, there are two variables that appear in the information area at the top of the panel. The following code segment shows how to give those variables correct values (before the panel is displayed).

```
OQ = 'MYOUTQ';             /* Set local output queue name */
LIB = 'MYLIB';             /* Set local library name      */

/* Get a pointer to the user exit program                 */

?CNVPGM PGM(QSFMOD)
        PTR(QSFMOD);

? PUTVAR  VARLST(&INFO)    /* Set dialog variable values  */
          APPID(&APPID);
```

The next segment of code shows how the list on the sample panel could be built. The loop control would be conditioned on the number of entries available to insert into the list.

```
/***********************************************************/
/* Add the desired number of entries to the list. Note that */
/* dialog variable OPT is not specified in variable list LIST, */
/* so the current value in the open application variable pool is */
/* used for each entry added to the list. Since the default */
/* initial value for action dialog variables is zero, every */
/* list entry added contains a blank OPT value. */
/***********************************************************/

DO for all available entries;    /* Loop for all available info */

SPID = value for spid;         /* Set local list entry values */
    FILE = value for file;
    NBR  = value for nbr;
    USER = value for user;
    PTY  = value for pty;
    RECS = value for recs;
    STS  = value for sts;
    COPY = value for copy;
    FORM = value for form;
    JOB  = value for job;
    JNBR = value for jnbr;

? ADDLSTE APPID(&APPID)        /* Set dialog variable values */
              LIST(OUTQLIST)       /* and add list entry */
              OPTION(*END)
              VARLST(&LIST);
  END;
```

If the list is complete, when the workstation operator attempts to scroll past the end of the list, a message is displayed indicating the end of the list has been reached.

If the SETLSTA macro had been invoked using CONTENTS(*TOP), the operator would be allowed to scroll beyond the end of the entries in the list. To accomplish this, the UIM would have returned to the program indicating that more entries were required in the list. At this time, the program would add more rows to the list and redisplay the panel. See 1.5, "Example 5 - A Mixed Panel (Data and List)" on page 52 for an example of incomplete list processing.

For this example, it is assumed that all entries have been added to the list. Since the UIM has now been given all information necessary to present the panel, we need only invoke the DSPPNL macro to display the panel to the work station operator. In this example all scrolling, action list processing, help displays, and command prompting and execution are handled by the UIM. Control only returns to the program when the operator presses a function key to PREVIOUS, EXIT, or REFRESH the display, or when the operator presses ENTER and there are no action list items or commands to process.

The FUNCTION parameter on the DSPPNL macro returns an indication of what function was requested that terminated the display. The program variable specified on this parameter is set with a value that indicates what function (PREVIOUS, EXIT, REFRESH etc.) is expected of the program.

```
? DSPPNL PANEL(WRKOUTQ)          /* Display panel to operator    */
        APPID(&APPID)
        FUNCTION(&FID)
        USRTASK(*NEW);
```

After the panel has been displayed, and control has returned to the calling program, the variable specified for the FUNCTION parameter can be checked to see what caused the return to the program.

```
IF FID = WUI$AEXT THEN           /* If EXIT function request     */
  DO;
    /* Handle EXIT processing */
  END;
ELSE
  DO;
    /* Handle PREVIOUS processing */
  END;
          .  .  .  .  .
          .  .  .  .  .
          .  .  .  .  .
```

From the example panel, a typical user may select the CHGSPLFA command (option 2) for one of the list entries to change the attributes of a spooled output file in the list. After the command is executed, the list needs to be updated to reflect the change.

To change the list entry, an exit program could be invoked. The name of the exit program is provided on the LISTACT tag with the USREXIT parm. The following is the code the EXIT program would probably run to reflect the change in the attributes. The exit program assumes that the list is already positioned at the appropriate entry and the dialog variables already contain values for this list entry because the UIM positions the list and reads the entry before it invokes the action routine and exit program.

```
SPID = new value for spid;       /* Setup any new list entry info */
FILE = new value for file;
NBR  = new value for nbr;
USER = new value for user;
PTY  = new value for pty;
RECS = new value for recs;
STS  = new value for sts;
COPY = new value for copy;
FORM = new value for form;
JOB  = new value for job;
JNBR = new value for jnbr;

? UPDLSTE APPID(&APPID)          /* Set dialog variable values   */
         LIST(OUTQLIST)          /* and update list entry        */
         VARLST(&LIST);
```

After all processing is done for the list (the user may have pressed the PREVIOUS key) the application should be CLOSED. The code necessary to close the application is as follows.

```
? CLOSEAPP APPID(&APPID);        /* Close the open application   */
```

With reference to the programming data flow charge of FIGS. 3a-3d, which show the sequence of functional operations effected by the program instructions, operation of the program begins block 500 when the application program opens the panel group. The application program has to be told which set of panels is going to be used, in other words, a name is given to the panel group to be handled. The application then goes into the main loop via block 501, where it sets the value of the variables in the variable pool. The variables are a set of values that are identified by their names and they can hold values which are data that the application can use. The values are set by referring to data in the application program and copying this data into the variable pool.

The display panel service of block 503 is that which actually performs the display of the panel. The following decision block 505 is actually in the display manager itself. The function of this block is to validate the request and make certain that the panel requested is the panel group.

In block 503 the application retrieves values that the user has altered on the display and does this by accessing the variable pool again and pulling these values out. This process is repeated by the decision made in block 504, which returns the program to block 501, until all variables have been retrieved.

When the application is complete, the decision in block 504 passes the program to block 506, where the application closes the panel group.

The display leg of the program begins with block 510, in which the conditions being used on the panel are checked. This step gathers up the conditions which are to be evaluated for the panel under consideration. Each panel has a distinct set of conditions. The panel language has a separate language inside of it for defining conditions that can be used to exclude or include elements onto a panel for display. Examples include function key definitions, which may be excluded from the screen, and thereby hold the function key in the inoperative state. The help text relating to the excluded function key is also blocked from display. Thus, when an object has been excluded, there is no remnant of that object.

In block 511, the conditions are evaluated, referencing the values that are in the variable field as well as system objects. An example of the latter category would be an item on the main menu of the system. It might be desirable to exclude certain menu items if the user does not belong to a class which, for example, is allowed to write into a particular field.

In block 512 the actual elements to be displayed are examined, and, in block 513, the decision is made as to whether the object is to be displayed. Each object may be conditioned or not. If it is not conditioned, it is displayed. If it is conditioned, the value of the condition is checked and, if it is true, the object is included for display.

Objects are assigned their appropriate positions on the display in block 514. The tentative position is assigned at compile time. The final position is subject to verification in this block.

Appropriate attributes are assigned to each object in the operation of block 515. Highlights, color and things of that nature are mapped to the display in accordance with the type of object, such as an instruction line.

The decision in 516 relates to determination of whether a variable value is involved for the particular object under consideration. Some objects, such as menu items, do not have a variable value and therefore do not require anything to be retrieved. Other objects, for example, data items, have displayed values which are given through the variable pool, necessitating an access to the pool, as shown in block 517, to retrieve the object for display. Any required conversion is also performed in this block. For example, a value may be stored in binary form and must be converted to decimal for display.

After this process has been completed for all objects on the display, as determined by block 518, a data stream is constructed from the developed list of objects and positions as shown in block 519. If all objects have not been considered, the program loops back from block 518 to the input of block 512, considering all objects in turn.

Therefore, at point A there has been established a new data structure which is essentially a list of all objects to be displayed with their attributes. The data stream is sent out to the display device in block 520. The data stream is interpreted and presented to the user by the display device. At block 521, the user views the screen, fills in the appropriate information and presses a function key to send the entered data, in the form of a data stream, back to the system, at block 522.

The data stream, as before, consists of locations and values. The operation at block 523 requires an examination of the function key pressed in block 521. If the function key related to a variable which is to be updated, the test at block 523 leads to block 524, which correlates the screen location with a particular object. Having identified the object involved, the object is examined in block 525 to see which of the variables in the variable pool is involved. The variable class is then checked to block 526 to see if there is any validity checking involved for the particular variable under consideration. If checking is involved, block 527 is entered and the appropriate checks are performed.

Block 528 operates in the result of the check. If the check failed, the process passes to block 529 where the entered value is tagged as an error. The data tagged as an error is then reshown on the display, block 530, and the work station user is given the opportunity, in block 531, to reenter the data correctly. Since the user may have made another error, the program returns to block 522 and the checking process is repeated to ensure that the new data is correct.

When the entered data passes the validity check, the operation of block 532 causes the variable value to be updated and the program loops back to the test in block 523 to see if all the variables have been updated. Eventually, the variable updating process is completed and the test in block 523 indicates that there are no remaining variables to be considered. The program then proceeds to block 540, where the function keys are examined to determine what dialog action is to take place. This is accomplished by mapping the function keys to the appropriate dialog action.

If the dialog action implies a return to the application, the test in block 541 passes to block 542 which effects the return to the application as shown. If other dialog action is indicated, the test performed in block 543 is performed to see if the dialog action is help. If the help action is requested, the block 544 begins the determination of what help was requested by determining the cursor position and correlating it to a specific object. Next, the display object identified in block 544 is tested to see what sort of object it is. The test in block 545 determines whether or not the object being evaluated was a command line.

If this test indicates that the object under consideration is a command line, the test in block 546 determines whether or not a command has been entered. If there is an entered command, block 547 serves to invoke run time support and display the help message for the specific command. If no command has been entered, the test of block 548 determines whether the command line had a menu option. If so, the block 549 selects the menu item as the object for the purposes of determining which help message should be displayed.

If the selected object is not a command line, as determined in block 545, or is not a command line with a menu option, as determined by block 548, the action in block 550 serves to display help for the selected object.

At block 560, a help list is constructed corresponding to all the objects on the panel, excluding those objects which were conditioned out. The first and last items on the list for which help is to be displayed first are so marked. In the usual case, this will be a single item corresponding to the selected object.

In block 561, the help application is invoked to display the help panels which are needed to get the help panel for the particular user panel. If, at this point, the user presses a function key requesting extended help, block 562 transfers operation to block 563 which presents extended help to the user. This will generally be all the help messages relating to all the objects identified. The user than takes appropriate action, for example, indicates that the use of the help message has been completed, as depicted in block 564, and the program returns to point A.

Returning now to block 543, if the test indicates that the dialog action is not help, block 570 tests to see if the dialog action was something which can be handled directly by the display manager, such as rollup, rolldown, or change view. If it is, runtime support performs the function and the program returns to point B as shown in block 571.

If the test in block 570 indicates that it is not a dialog action which can be handled directly by the display manager, block 580 looks to see if it is a command request. If it is, the request is submitted to the system in block 581 and the program returns to point A. If it is not, block 582 is entered and either a return to the application occurs or the panel is reshown, depending on how the user coded the panel to handle a null situation.

We claim:

1. A method for generating display panels using a program interface which provides for defining display panels where the resulting definitions a) may be used by one or more applications, b) provide consistency of said defined display panels between said application programs, and c) provide for independence of panel format from the device on which the display panel are displayed, said method used on a data processing system having display devices and storage means and a processor, said method comprising the steps of:

a. providing a panel definition by means of said program interface by:
   identifying one or more display objects, said display objects to be displayed as part of said display panels, said display objects comprising instruction lines, data entry areas, menu areas command lines, and messages;
   associating with each of said display objects a display object tag;
specifying for each display panel, a variable title;
associating with said variable title a panel tag; and
associating with said panel tag at least one of said display object tags;

b. storing said panel tag, said display object tags, and said definitions of said display objects in said storage means;

c. providing to said processor said panel tag by a first application program, said first application program being stored in said storage means;

d. accessing said storage means for said processor and locating within said storage means said variable title associated with said panel tag, said display object tags associated with said panel tag, and said display objects associated with said display object tags; and e. displaying said display panel, comprised of said associated variable title and said associated display objects, on at least one of said display devices.

2. A method for generating display panels as in claim 1 in which, in said program interface, one of said display object tags associated with said panel tag is associated with a display object which is a message.

3. A method for generating display panels as in claim 1 in which, in said program interface, one or more of said panel tags comprise a panel group.

* * * * *